(12) United States Patent
McElvain et al.

(10) Patent No.: US 7,583,412 B2
(45) Date of Patent: Sep. 1, 2009

(54) SYSTEM AND METHOD FOR CREATING PATTERNED ENCODED HALFTONES

(75) Inventors: John McElvain, Manhattan Beach, CA (US); Charles Michael Hains, Altadena, CA (US)

(73) Assignee: Xerox Corporation, Norwalk, CT (US)

( * ) Notice: Subject to any disclaimer, the term of this patent is extended or adjusted under 35 U.S.C. 154(b) by 644 days.

(21) Appl. No.: 11/443,016

(22) Filed: May 31, 2006

(65) Prior Publication Data

US 2007/0279693 A1  Dec. 6, 2007

(51) Int. Cl.
*G06K 15/00* (2006.01)
*H04N 1/40* (2006.01)

(52) U.S. Cl. .................. 358/3.08; 358/1.9; 358/3.06; 358/3.23

(58) Field of Classification Search ............... 358/3.06, 358/1.2, 1.9, 3.03, 3.13, 3.08, 3.23
See application file for complete search history.

(56) References Cited

U.S. PATENT DOCUMENTS

| | | | |
|---|---|---|---|
| 4,149,194 A | | 4/1979 | Holladay |
| 5,479,263 A | | 12/1995 | Jacobs et al. |
| 5,867,599 A | * | 2/1999 | Michaelis et al. ........... 382/237 |
| 5,949,966 A | * | 9/1999 | Hayashi ...................... 358/1.9 |
| 2007/0236736 A1 | * | 10/2007 | Tai et al. .................... 358/3.01 |
| 2007/0252838 A1 | * | 11/2007 | Hains et al. ................. 345/467 |

\* cited by examiner

*Primary Examiner*—Twyler L Haskins
*Assistant Examiner*—David L Suazo
(74) *Attorney, Agent, or Firm*—Pillsbury Winthrop Shaw Pittman LLP (57) ABSTRACT

An embodiment described below provides a system that allows a user to provide an exact implementation or a close approximation to any desired Holladay dot to a printer with super-resolution encoding (SRE)/decoding (SRD) capabilities. In particular, the embodiment converts a desired Holladay dot to an SRE dot. The SRE dot or SRE look-up table may be uploaded to a printer that supports SRE/SRD.

12 Claims, 10 Drawing Sheets

| | | | | | | | | | | | |
|---|---|---|---|---|---|---|---|---|---|---|---|
|144,|12,|0,| | | | | | | | | |
|253,|243,|221,|172,|80,|30,|9,|5,|19,|69,|189,|239|
|214,|218,|200,|168,|112,|51,|27,|23,|48,|101,|158,|211|
|193,|197,|165,|140,|126,|108,|76,|73,|104,|122,|136,|161|
|58,|62,|94,|119,|133,|151,|182,|179,|147,|129,|115,|90|
|37,|41,|44,|97,|154,|207,|232,|228,|204,|143,|87,|55|
|12,|2,|16,|66,|186,|236,|250,|246,|225,|175,|83,|34|
|9,|5,|19,|69,|189,|239,|253,|243,|221,|172,|80,|30|
|27,|23,|48,|101,|158,|211,|214,|218,|200,|168,|112,|51|
|76,|73,|104,|122,|136,|161,|193,|197,|165,|140,|126,|108|
|182,|179,|147,|129,|115,|90,|58,|62,|94,|119,|133,|151|
|232,|228,|204,|143,|87,|55,|37,|41,|44,|97,|154,|207|
|250,|246,|225,|175,|83,|34,|12,|2,|16,|66,|186,|236|

SYSTEM AND METHOD FOR CREATING PATTERNED ENCODED HALFTONES

The present application relates generally to digital document production equipment.

BACKGROUND

Digital printers commonly provide a limited number of output possibilities, and are commonly binary, i.e., they produce either a dot or no dot at a given pixel location. Thus, given a color separation with 256 shades of a subtractive primary color, a set of binary printer signals is produced to approximate the continuous tone (contone) effect. This process is referred to as halftoning.

In such arrangements, over a given area and the separation having a number of contone pixels therein, each pixel value of an array of contone pixels within the area is compared to one of a set of preselected thresholds (the thresholds may be stored as a dither matrix and the repetitive pattern generated by this matrix is considered a halftone cell) as taught for example in U.S. Pat. No. 4,149,194 to Holladay, the entirety of which is incorporated herein by reference. The effect of such an arrangement is that, for an area where the image is a contone, some of the thresholds in the matrix will be exceeded, i.e., the image value at that specific location is larger than the value stored in the dither matrix for that same location, while others are not.

In the binary case, the pixels or cell elements for which the thresholds are exceeded might be printed as black or some color, while the remaining elements are allowed to remain white or uncolored, dependent on the actual physical quantity described by the data. Since the human visual system tends to average out rapidly varying spatial patterns and perceives only a spatial average of the micro-variation in spot-color produced by a printer, the halftone process described above can be used to produce a close approximation to the desired color in the contone input.

Generally, the resulting binary data is at a higher resolution relative to the input contone data. For example, an iGen3® printer made by Xerox® Corporation may receive 600×600×8 contone data from the controller and send a 4800×600×1 binary (halftoned) data to the raster output scanner (ROS). Other model engines also may expect 600×600×8 data, and the halftoning modules produce 2400×2400×1 binary patterns.

The dither matrix of threshold values is often referred to as a Holladay halftone dot or "screen," and the process of generating the binary image from the contone image using the screen is called halftoning or "screening."

Halftone screens are typically two-dimensional threshold arrays and are relatively small in comparison to the overall image or document to be printed. Therefore, the screening process uses an identical halftone screen repeated for each color separation in a manner similar to tiling. The output of the screening process, using a single-cell halftone dot, includes a binary pattern of multiple small arrays (i.e., "dots"), which are regularly spaced, and is determined by the size and the shape of the halftone screen. In other words, the screening output, as a two-dimensionally repeated pattern, possesses at least two fundamental spatial frequencies, which are completely defined by the geometry of the halftone screen.

Color printers, due to memory constraints, often have only a few preconfigured screens. A printer controller may have the capability to change between these screens at a page boundary or within a page on an object-tag basis. However, the controller cannot configure the engine to use a different screen that may be more appropriate for a particular application. Thus, the user is limited to use the predefined image screens, even though another screen (not predefined) may be more appropriate for the imaging application. As a result, the image rendering may be sub-optimal.

SUMMARY

A preferred embodiment converts a contone-to-binary halftoning array to a contone-to-encoded pattern halftoning array. The contone-to-binary halftoning array is configured to be used in image processing to convert an input contone array of contone data values to an output binary array of binary data values based on comparing each contone data value to each threshold value. The contone-to-encoded pattern halftoning array is configured to convert an input contone array of contone data values to an output encoded array of pattern values based on comparing each of the contone data values to each set of pattern look-up tables, wherein the comparison generates M encoded pattern values for each contone data value and each encoded pattern value or "code" corresponds to a multi-pixel pattern of binary data values in a library.

The preferred method includes replicating the threshold values into a replicated array and dividing the replicated array into M blocks of threshold values. At each contone data level, the blocks of threshold values are converted to binary data values to form a desired pattern in the block. At each contone data level, the desired pattern in each block is correlated to a multi-pixel pattern in the library, and a pattern value or "code" corresponding to the multi-pixel pattern is entered in an array for the block, thereby generating M sets of arrays. The M sets of arrays are compiled to populate M sets of pattern look-up tables to forming the contone-to-encoded pattern halftoning array.

BRIEF DESCRIPTION OF THE DRAWINGS

FIG. 11 illustrates an exemplary SRE dot based upon a Holladay dot, in accordance with a preferred embodiment.

DETAILED DESCRIPTION

An embodiment described below provides a system that allows a user to provide any desired Holladay dot to a printer with super-resolution encoding (SRE)/decoding (SRD) capabilities. In particular, the embodiment converts a desired Holladay dot to an SRE dot. The SRE dot or SRE look-up table may be uploaded to a printer that supports SRE/SRD for use by the SRE halftoning system disclosed in co-pending patent application Ser. No. 11,443,351, entitled "System and Method for Patterned Encoded Halftoning," by J. McElvain et al. filed on May 31, 2006, herewith, which is incorporated herein by reference in its entirety. In this manner, a user may bypass the pre-programmed screens of a printer to achieve the desired image rendering.

The exemplary embodiment describes a method for converting a traditional Holladay dot (intended for 2400×2400 rendering) into a 600×600 SRE halftone description to enable printing of SRE halftones on engines that support SRE/SRD. However, the techniques described herein may be applied in other contexts.

Figure 1:
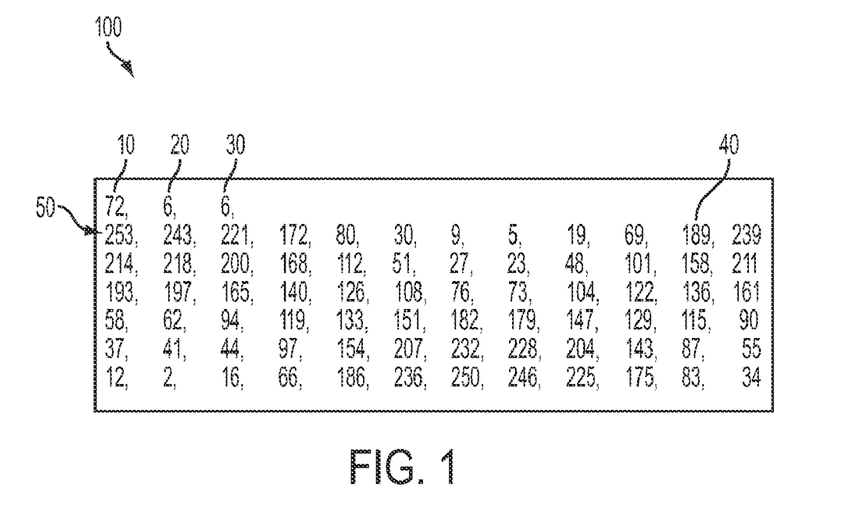
FIG. 1 shows a conventional Holladay dot.

FIG. 1 shows an exemplary Holladay dot. As shown in FIG. 1, the size field or number of elements 10 in a Holladay dot 100 is 72. A height field 20 of Holladay dot 100 is 6, indicating the dot has 6 rows. Indeed, in this example, Holladay dot 100 has a matrix of elements 50 that is 6 rows by 12 columns, giving it a size of 72 elements as shown in size field 10. Shift field 30 indicates the amount to offset a Holladay dot (sometimes called a "brick") at subsequent rows. A Holladay brick is placed across a page for each corresponding sub-array of pixels of contone data, similar to tiling. In this example, shift field 30 has a value of 6, indicating that the second row of Holladay bricks will be shifted 6 units to the left from the beginning of the first row.

Matrix of elements 50 determines the pattern of small dots to represent each incoming corresponding group of pixels of the contone image. Each element 40 is a predetermined threshold level that will be compared with the contone data to determine whether a corresponding dot should be printed.

Figure 2:
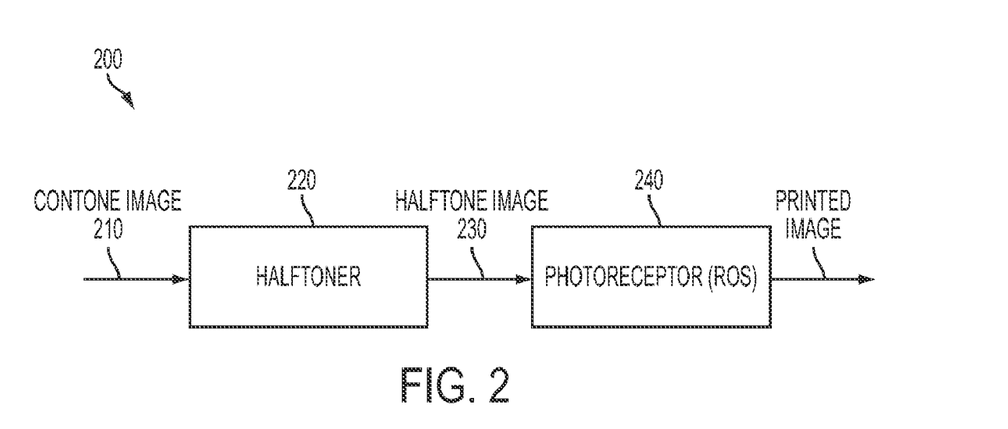
FIG. 2 illustrates a conventional system using a Holladay dot for screening.

FIG. 2 illustrates a conventional system using a Holladay dot for screening. System 200 includes an input contone image 210. Contone image 210 includes 600×600×8 contone data. Thus, each pixel of contone image 210 is an 8-bit data unit, representing a gray level from 0-255. However, one of ordinary skill in the art will appreciate that contone image 210 may include data of any size or dimensions.

Halftoner 220 renders intensity or lightness levels by converting the incoming continuous tone image 210 to a halftone image 230. A halftone representation is an approximation of an original image that uses a series of carefully placed dots to create an appearance of continuous tones when viewed from the normal viewing distance. The halftone data is written as binary patterns (dot/no dot) onto a photoreceptor 240 of a printer, such as a production level color xerographic printer. The resulting halftoned image has a binary pattern at a higher resolution than the contone data.

Halftoner 220 uses a particular Holladay dot for rendering the halftone data. For example, upon receipt of an 8-bit pixel of contone data having a gray level of "37," halftoner 220 compares the raw data to each element 40 within matrix 50 of Holladay dot 100 and writes a pattern to photoreceptor 240 accordingly. In particular, halftoner 220 prints a dot where each threshold level 40 gray level "37" exceeds and would not print a dot (e.g., leave paper uncolored) where each threshold level 40 gray level "37" does not exceed.

Referring to FIG. 1 for a gray level of "37," halftoner 220 would not place a dot (e.g., leave paper uncolored) at the first element 40, because gray-level "37" does not exceed the threshold level 253 of that element. Continuing along the first row of Holladay dot 100, dots would not be placed until reaching the sixth element, which has a value of 30 (e.g., 37>30). Likewise, a dot would be placed at elements 40 having threshold levels of 9, 5, and 19, respectively, but would not be placed for the last three elements of the row having threshold levels of 69, 189 and 239.

Dots are printed for each row of matrix 50 based upon a comparison of the threshold values to the gray level as described above, thereby producing a brick (e.g., halftoned data) for the gray-level "37."

Figure 3:
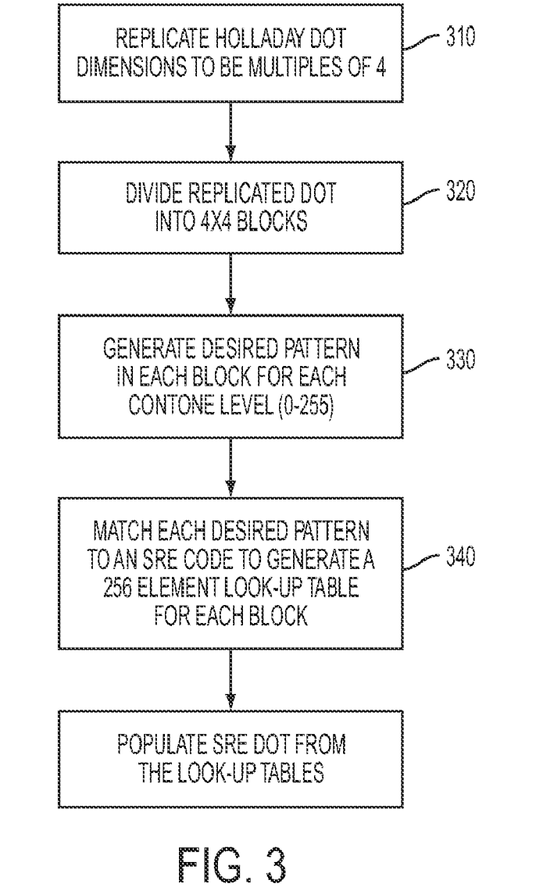
FIG. 3 illustrates a method for converting a Holladay dot into an SRE dot, in accordance with a preferred embodiment.

FIG. 3 illustrates a method for converting a Holladay dot into an SRE dot, in accordance with a preferred embodiment. At step 310, a Holladay dot is replicated until its length, height and shift become integer multiples of 4. An integer multiple of four ensures an integer number of 4×4 blocks during SRE pattern matching. The integer multiple of 4 on the shift field also maintains the original shift of the Holladay dot for the SRE dot, thereby allowing proper alignment during screening.

One of ordinary skill in the art will appreciate that various modifications can be made to the preferred embodiment consistent with the principles disclosed herein. For example, although the preferred embodiment discloses an application involving 4 by 4 SRE codes, the embodiment may be modified to accommodate codes or patterns of varying sizes. When a library of K by L patterns is used to execute the principles disclosed herein, replication of the Holladay dot may be to ensure the replicated dot can be subdivided to an integer number of K by L blocks.

The width of a brick can be computed by dividing the value of the size field 10 by the value of the height field 20. Referring to FIG. 1, Holladay dot 100 has a size field 10 of 72 and a height field 20 of 6. Therefore, the width of the brick is 12, which is a multiple of 4. However, each of height field 20 and shift field 30 has a value of 6, which is not a multiple of 4. The lowest multiple each of these numbers can be multiplied by to become a multiple of 4 is 2 in this example. Thus, to replicate Holladay dot 100 to have a multiple of 4, each field 20 and 30 is multiplied by 2, yielding a replicated size field having a value of 144, a replicated height value of 12 and a replicated initial shift field of 12. However, because the shift field represents an offset of the dot on subsequent rows, the shift field is calculated modulo the number of columns of the dot. In this case, there are 12 columns. Thus, the value of the replicated shift field equals 12 modulo 12, which is zero.

In one embodiment, the width and the height are first adjusted to become a multiple of 4. Then, the resulting shift is computed using the same multiplier as the height. If the resulting shift is not a multiple of 4, then the adjusted height and resulting shift are further multiplied by a multiple that results in the shift becoming a value of 4.

Figure 4:
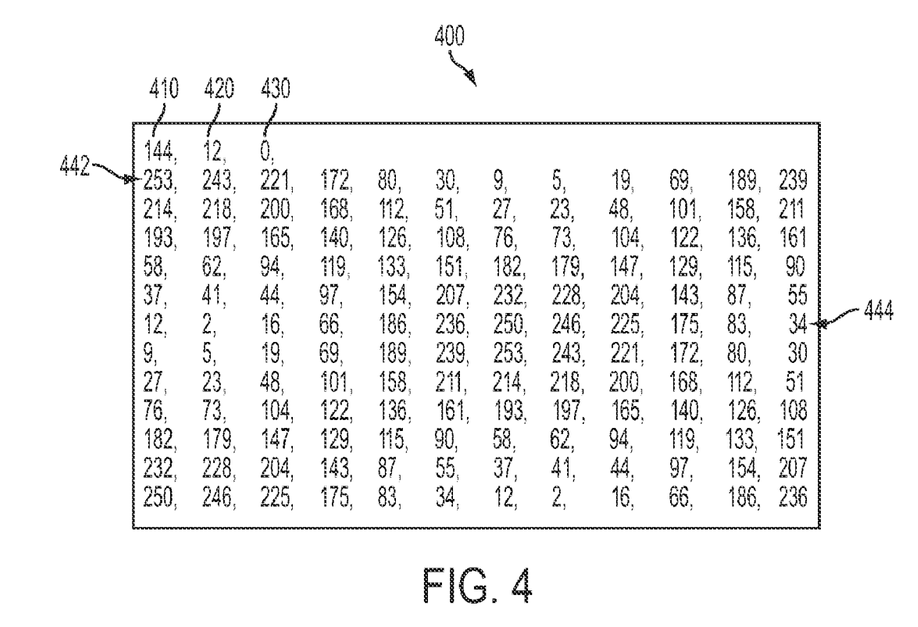
FIG. 4 illustrates a replicated Holladay dot, in accordance with a preferred embodiment.

FIG. 4 illustrates a replicated Holladay dot, in accordance with a preferred embodiment. Replicated dot 400 includes a size field 410, a height field 420 and a shift field 430. Replicating Holladay dot 100, for example, so that a height field, shift field and computed width are multiples of 4 yields: a size field 410 equal to 144, a height field 420 having a value of 12 and shift field 430 having a value of 0 after replication.

A value of 12 in the height field requires replicated dot 400 to have 12 rows in a matrix of elements 440. Similarly, a value of 144 in the size field requires the matrix of elements 440 to have 12 columns of elements to obtain the requisite number of elements.

However, the original Holladay dot 100 includes only 72 of the necessary 144 elements for matrix of elements 440. To obtain the remainder, the data in elements 40 is replicated.

In particular, the first 72 elements 440 of the matrix of elements 440 appear in the same order or arrangement as the original Holladay dot 100. Thus, the first element 442 in the first row of matrix of elements 440 has a value of 253 and the seventy-second element 444 has a value of 34, as does Holladay dot 100.

The remaining or second 72 elements of replicating dot 400 are also the 72 elements of Holladay dot 100; however, they have been shifted according to shift field 30 of Holladay dot 100 to maintain proper alignment.

With a shift of six specified at shift field 30 of Holladay dot 100, entries of each row in the Holladay dot 100 are shifted to the left by 6 column entries. Thus, the seventy-third element (row 7, col. 1) of replicated dot 400 has the same threshold level as that of the seventh element (row 1, col. 7) of Holladay dot 100. Similarly, the seventy-ninth element (row 7, col. 7) of replicated dot 400 has the same threshold level as that of the first element (row 1, col. 1) of Holladay dot 100.

One of ordinary skill in the art will appreciate that FIG. 4 is exemplary of a replicated dot and is not limiting the dot to any particular size or shape. Because Holladay dots include innumerable different shapes and sizes, a replicated dot in accordance with the system and method disclosed herein also includes innumerable different shapes and sizes.

Returning to FIG. 3, the matrix of elements 440 of replicated dot 400 is divided into grids (step 320) and schematically illustrated (step 330) for pattern matching. In particular, at step 320 elements 440 of replicated dot 400 are subdivided into 4×4 blocks (e.g., a size of an SRE pattern), and at step 330 the threshold levels of elements 440 are compared to a contone level and schematically illustrated as a "dot" (e.g., darkened or filled element) when the contone level exceeds the threshold level of the element and "no dot" (e.g., white or uncolored) when the contone level does not exceed the threshold level. The process is repeated for each contone level 0-255, forming a 256 element lookup table or array for each 4×4 block. Although the preferred embodiment discloses 4 by 4 SRE patterns, one of ordinary skill in the part will appreciate that any K by L may be used. For example, a Holladay dot 100 may be replicated to have a matrix of threshold values that is divisible by an integer number of K by L blocks.

Figure 5:
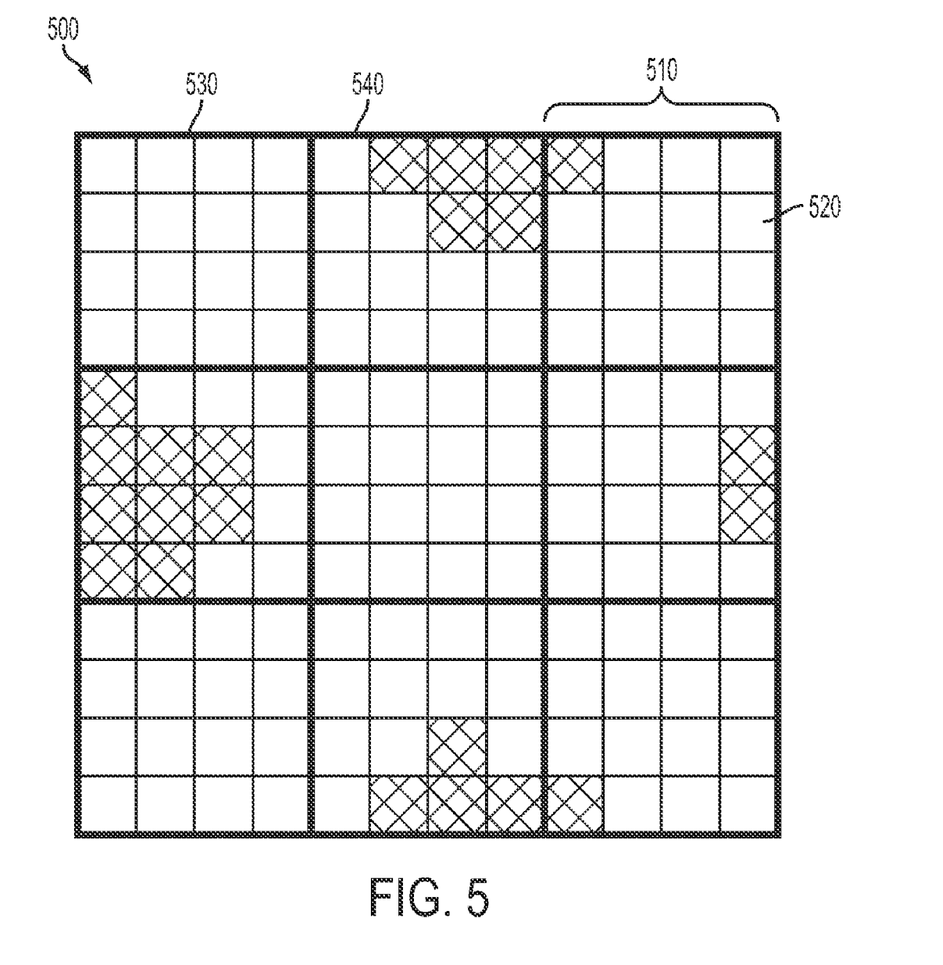
FIG. 5 shows elements subdivided in a grid format and schematically illustrated for a given contone level, in accordance with a preferred embodiment.

FIG. 5 shows elements 440 subdivided in a grid format (step 320) and schematically illustrated for a given contone level (step 330), in accordance with a preferred embodiment. Pattern matching grid 500 shows the 12 rows and 12 columns of elements 440 of replicated dot 400 divided into nine 4×4 blocks 510. Each block 510 corresponds to an SRE dot or pixel computation.

Each block 510 contains 16 elements 520. Elements 520 schematically illustrate elements 440 for a contone level of "37." For example, referring to FIG. 4 the top 4×4 block of elements 440 all have threshold values greater than "37." Thus, upper left block 530 (corresponding to the top 4×4 block of elements 440) has no dot (e.g., darkened or filled element) anywhere in this block. In contrast, block 540 shows darkened areas or dots corresponding to the threshold levels exceeded by contone level "37" (e.g., threshold levels 30, 9, and 5 of row 1 and threshold levels 27 and 23 of row 2 are exceeded by contone level "37"). Repeating the comparison of the contone level "37" to each of the 144 threshold values of elements 440 yields the schematic bit pattern shown in FIG. 5.

To obtain an SRE representation of the Holladay dot for the other 255 contone levels, a 256 element lookup table is defined for each block 510. In this manner, there is a schematic bit pattern for each block 510 at each of the 256 contone levels. The schematic bit pattern represents the "desired" pattern or the Holladay pattern to be converted into one of the SRE codes by pattern matching or correlation of the patterns (step 330).

Figure 6:
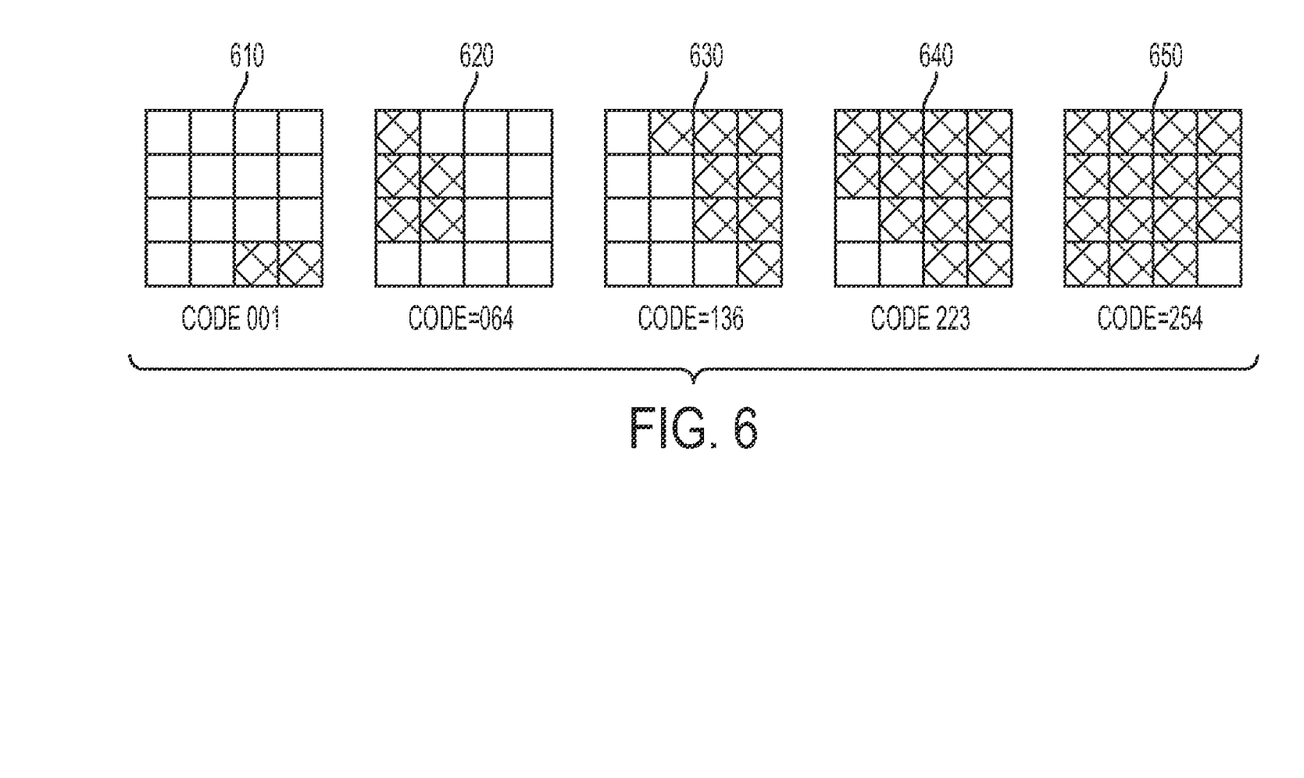
FIG. 6 shows exemplary, conventional SRE codes.

For 8-bit super-resolution encoding, there are 256 possible SRE/SRD codes, representing different 4×4 bit patterns. FIG. 6 shows a few exemplary SRE codes. Pattern 610 represents an SRE code of "001.". Similarly, patterns 620, 630, 640 and 650 represent the SRE codes of "064," "136," "223," and "254," respectively.

In step 340, the 256 element lookup table for each block 510 is populated with SRE codes that match or most closely match the desired, Holladay pattern at each contone level (0-255). In other words, each entry of the 256 element lookup table or array of a single block 510 represents a "desired" pattern to be converted into one of the 256 SRE codes. SRE codes 0-255 are analyzed to find the code that most closely matches the desired pattern. At each table entry for each block, the SRE pattern that is the closest match to the desired pattern is entered as the appropriate conversion.

Because there are only 256 possible SRE codes, it is unlikely that every desired pattern shown in block 510 will exactly match an SRE code. Thus, there may be some loss in the conversion from the Holladay dot to an SRE dot representation. However, with some SRE code dimensions and halftone dot designs, there can be an exact match of patterns to available codes. Examples of this are SRE patterns with K by L dimensions of 2×4 or 1×8.

Figure 7:
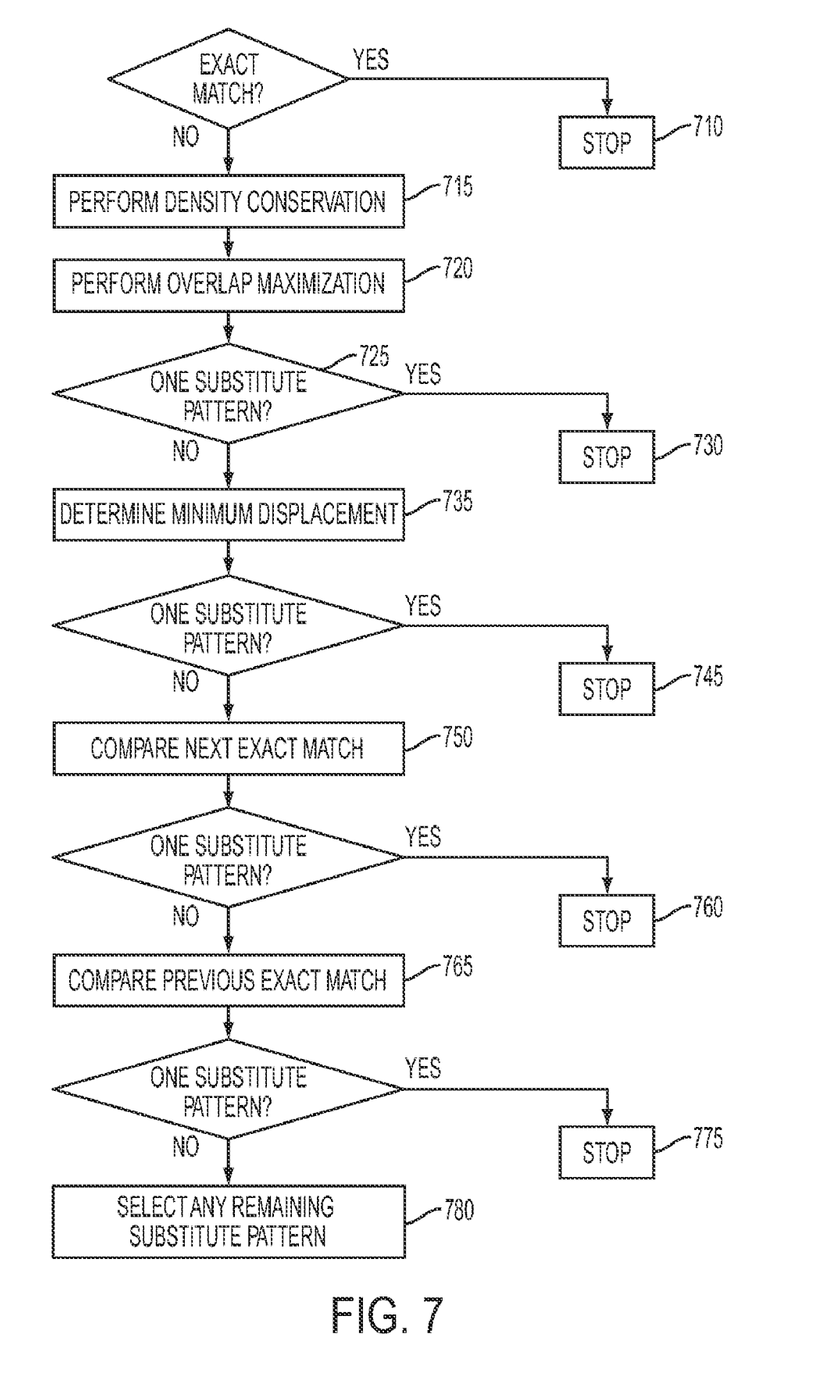
FIG. 7 illustrates the pattern matching process, in accordance with a preferred embodiment.

FIG. 7 illustrates the pattern matching process, in accordance with a preferred embodiment. Focusing on a single 4×4 block 510 at a time, the system first attempts to populate the 256 element lookup table for a block 510 with exact pattern matches (step 710). In a preferred embodiment, a flag is also stored in the 256 element lookup table, indicating whether or not an exact match was found. Each time an exact match is found at a particular level 0-255, the appropriate SRE code is placed in the lookup table and the element is flagged as an exact match. Otherwise, the level may be flagged as no match.

For those levels where an exact match is not found, it is necessary to find the "best" substitution among the available SRE codes, thereby minimizing loss in the conversion from a Holladay dot to an SRE dot representation.

From the standpoint of macroscopic uniformity, perhaps the most important criteria for substitution is conservation of density. Thus, at step 715 the fill factor or density of a desired pattern is determined. Turning to FIG. 5 as an example, block 530 would have a fill factor of "5" because 5 elements of the 4×4 block are filled. Similarly, block 520 would have a fill factor of "0" because there are no dots in that block.

At step 715, SRE codes with a density equivalent to that of the desired pattern are identified. The identified SRE codes with matching density form an initial search space, which may significantly reduce the number of patterns for further processing.

Figure 8:
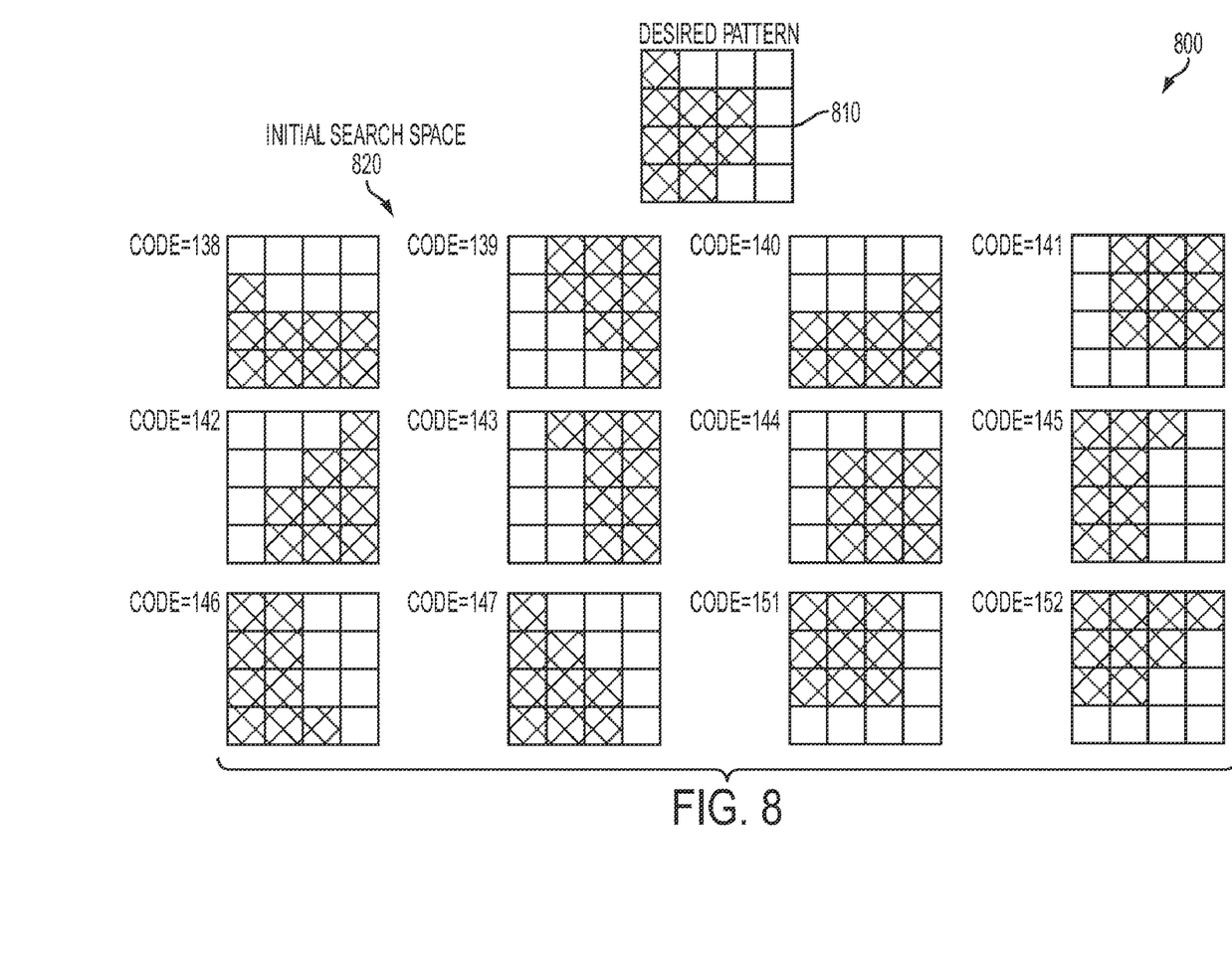
FIG. 8 schematically illustrates the application of density conservation, in accordance with a preferred embodiment.

FIG. 8 schematically illustrates the application of density conservation, in accordance with a preferred embodiment. System 800 includes a desired pattern 810 with a fill factor of "9." Initial search space 820 includes 12 possible SRE patterns of the original 256 patterns that also have a fill factor of "9." By reducing the number of patterns considered as a "best" match to desired pattern 810 from 256 to 12, the system may save significant processing and memory requirements while also improving the accuracy of the resulting match.

At step 720, the search space is further reduced by identifying one or more SRE patterns having a maximum overlap with the desired pattern. In particular, the desired pattern is XORed with each of the patterns in the initial search space to determine whether one or more than one SRE codes have a maximum overlap relative to the desired pattern (step 725).

If only one code has a maximum overlap, that code is considered the best match and entered into the lookup table described above (step 730). In FIG. 8, for example, one code, SRE code 147, would provide the maximum overlap. Thus, the pattern matching processing would stop and code 147 would be entered in the lookup table to be used for the SRE dot substitution.

However, in many cases there may be more than one SRE code with a maximum overlap relative to the desired code. In this case, further processing is performed to further prune the list of available codes. In addition to the metrics of density conservation and overlap maximization, it is also important to consider the displacement of pixels of the substitution patterns (e.g., substitute pattern) relative to the original pattern when making a substitution.

At step 735, the search space is further reduced by identifying SRE codes with minimum displacement of pixels relative to the desired pattern. To compute displacement, the positions of pixels gained and pixels lost of the possible SRE patterns (e.g., substitute pattern) relative to the desired pattern are determined using logical operations, such as XOR and AND operations. In particular, the following mathematical equations may be used to calculate the number of pixels lost and the number of pixels gained.

Pixel(s) lost=(desired pattern XOR substitute pattern) AND desired pattern

Pixel(s) gained=(desired pattern XOR substitute pattern) AND substitute pattern

In accordance with a preferred embodiment, the positions of the lost and gained pixel(s) may be identified on the 4×4 block as a lost pixel vector point and gained pixel vector point, respectively, to define a displacement vector from the lost pixel vector point to the gained pixel vector point. From the displacement vector, displacement of the lost pixels to the gained pixels may be calculated using the Pythagorean Theorem.

In a preferred embodiment, displacement minimization is only applied when the number of gained pixels and the number of lost pixels both are equal to "1." However, in another embodiment, the lost pixel vector point and/or gained pixel vector point can be found from a center of mass of the position of the lost and/or gained pixel points respectively. The latter technique would be effective only if the gained pixels are highly clustered and the lost pixel points are highly clustered. In another embodiment, a clustering is determined and displacement minimization is applied even when the pixels lost or gained are greater than 1 if the clustering meets or exceeds a requisite clustering threshold value.

In a preferred embodiment, the pattern with the minimum displacement is selected as the best substitution (step 745).

Figure 9:
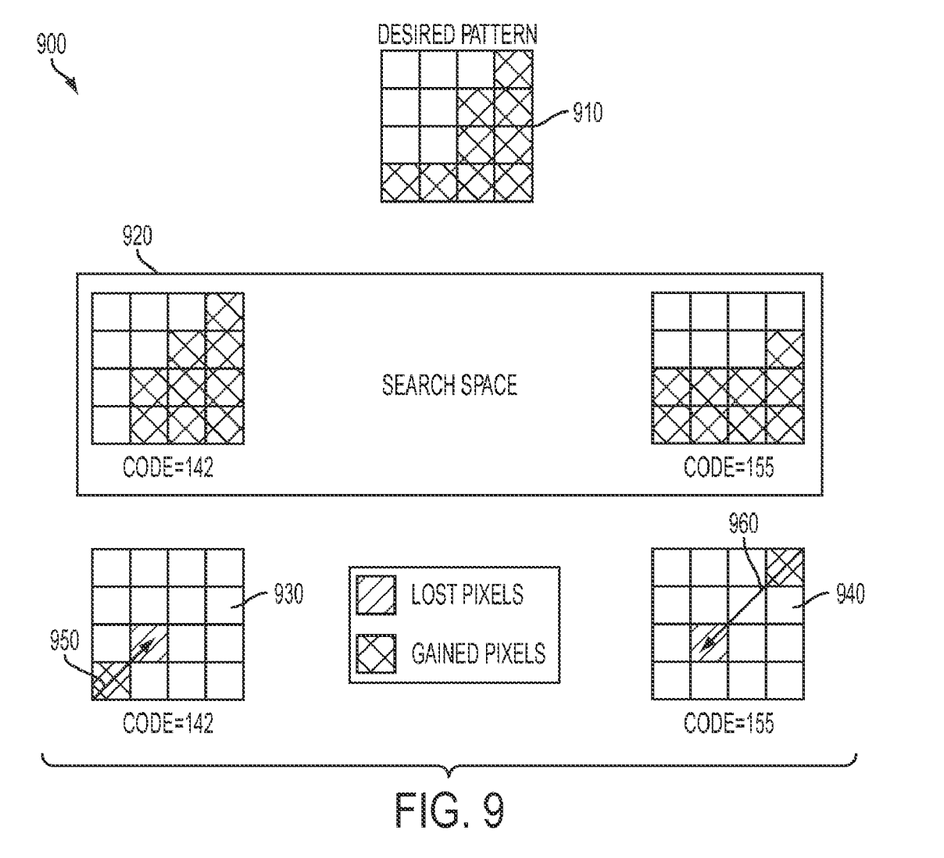
FIG. 9 schematically illustrates the application of minimum displacement step, in accordance with a preferred embodiment.

FIG. 9 schematically illustrates the application of minimum displacement step, in accordance with a preferred embodiment. System 900 includes a desired pattern 910 with a fill factor of "9." Search space 920 after reducing the search space according to the metrics of density conservation and overlap maximization includes 2 possible SRE patterns of the original 256 patterns that have a fill factor of "9" and a maximum overlap relative to the desired pattern. Positional space 930 and 940 shows the positions of pixels lost and pixels gained for the substitutions of code 142 and code 155, respectively, upon an application of the mathematical equations described above. Displacement vectors 950 shows the displacement vector of pixels lost to pixels gained for SRE code 142. Thus, displacement vector 950 may be determined upon an application of Pythagorean Theorem, as follows:

$$\text{Displacement of code } 142 = \sqrt{(1^2+1^2)} = \sqrt{2}$$

Similarly, displacement vectors 960 shows the displacement vector of pixels lost to pixels gained for SRE code 155, the displacement vector 960 being calculated as follows:

$$\text{Displacement of code } 155 = \sqrt{(2^2+2^2)} = 2\sqrt{2}$$

Thus, in the example of FIG. 9, SRE code 142 has the minimum displacement and would be entered into the lookup table as the best substitution.

Occasionally, there will be cases in which there are still multiple SRE codes even after density conservation, overlap maximization and displacement minimization. Thus, additional pruning is required to distinguish among the codes. Because halftone dot patterns for a particular contone level generally exhibit high correlation with adjacent levels, further pruning can be performed by looking at the growth of a particular SRE dot pixel.

Thus, at step 750 each of the remaining codes in the search space is compared to the "next" flagged exact match in the lookup table. Starting with the contone level where substitution is required the system finds the next contone level where an exact match was found at the same 4×4 block position. Comparing the "next exact match" pattern to the possible substituted patterns may lead to further reduction of the substituted pattern list by finding the next pattern that maximizes the overlap.

Figure 10:
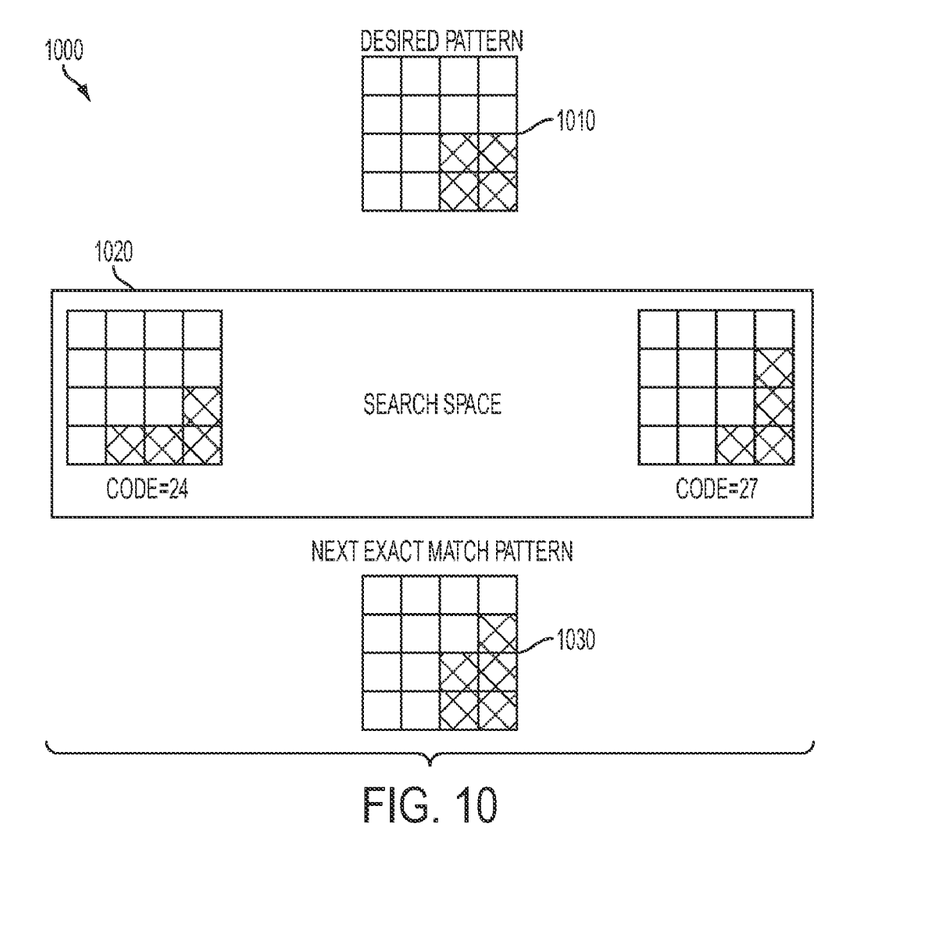
FIG. 10 schematically illustrates the application of the next exact match step, in accordance with a preferred embodiment.

FIG. 10 schematically illustrates the application of the next exact match step, in accordance with a preferred embodiment. System 1000 includes a desired pattern 1010 with a fill factor of "4." Search space 1020 after pruning the search space according to the metrics of density conservation, overlap maximization and displacement minimization still includes 2 possible SRE patterns. Both code 24 and code 27 would be equally good choices for a substitution, because their displacement relative to the desired pattern is the same and their overlap is the same.

However, next exact match 1030—identified by a search of the lookup table—indicates that code 27 represents a better choice because it has a higher correlation to the next exact pattern.

If one SRE code has the best next match, it is entered as a best substitute in the look up table (step 760). Otherwise, at step 765 each of the remaining SRE codes in the search space is compared to the "previous" flagged exact match in the lookup table. Starting with the contone level where substitution is required, the system finds the previous contone level where an exact match was found at the same 4×4 block position. If one SRE code has the greatest correlation with the "previous exact match" it is entered as the best substitute in the lookup table (step 775). Otherwise, if multiple possible substitute SRE patterns still remain, any of them may be chosen as the best substitute and entered into the lookup table (step 780). Notably, at step 780 the remaining SRE patterns for substitution would all have the same overlap and displacement relative to the desired pattern. Further, they would have the same correlation relative to exact matches for adjacent levels.

After a 256 element lookup table associated with each SRE dot pixel or 4×4 block is populated, a list of thresholds/SRE codes are constructed for all pixels in the SRE dot. For a particular 4×4 block, the values of the 256 element lookup table will be piecewise clockwise. For example, elements 0 through 29 may have an SRE code value of "0," elements 30 through 40 may have an SRE code value of "15," elements 41 through 55 may have an SRE code value of "45," and so on until the 4×4 block is completely filled. Therefore, a list of thresholds may be created to describe this piecewise continuity having the following contone thresholds: 29, 40, . . . with the following corresponding SRE codes: 15, 45, . . . .

In a preferred embodiment, a contone value below a first threshold in the list of thresholds (a contone value below "29" in the above example) would be assigned an SRE code of "0." Similarly, a contone value equal to or greater than the first threshold and below the second threshold (e.g., a contone value in the range of 29 to 39) is assigned a first SRE code in the list of SRE codes (e.g., an SRE code of "15"). However, other implementations for mapping the thresholds to SRE codes are envisioned.

FIG. 11 illustrates an exemplary SRE dot based upon Holladay dot 100, in accordance with a preferred embodiment. SRE dot 1100 has a size field 1110 of "9," a height field 1120 of "3," and a shift field 1130 of "0." Referring also to FIG. 5, replicated SRE dot 500 of Holladay dot 100 included 9 SRE pixels, which represents the size of SRE dot 1100. Similarly, replicated SRE dot 500 has 3 rows, which represents the height of SRE dot 1100. The calculation of "0" in shift field 1130 also was described previously with reference to FIG. 4.

A list of thresholds 1140 and a list of corresponding SRE codes 1150 associated with the thresholds is provided for each of the 9 pixels of SRE dot 1100. As described above, for each SRE pixel, a 256 element lookup table is created to represent Holladay dot 100 as substitute SRE codes at each of the 256 contone levels. Based upon this 256 element lookup table for a given pixel, a subset list of threshold values 1140 and corresponding SRE codes 1150 is created. For example, threshold values/SRE codes for the upper left block pixel 530 is provided at 1142. Similarly, threshold values/SRE codes for the upper center block pixel 540 is provided at 1144. Array 1146 corresponds to the upper right pixel of replicated SRE dot 500, and array 1148 corresponds to the center left pixel of replicated SRE dot 500. In one preferred embodiment, the number of thresholds for codes in each block is equal to (K*L). Other preferred embodiments may reduce the number of thresholds by one for each case that a particular area coverage (number of spots turned on) is not available in the available set of SRE codes.

One of ordinary skill in the art will appreciate that the system is not limited to any particular arrangement of pixels within SRE dot 1100.

The foregoing disclosure of the preferred embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for converting a contone-to-binary halftoning array to a contone-to-encoded pattern halftoning array,
   the contone-to-binary halftoning array having X by Y threshold values, the contone-to-binary halftoning array being configured to be used in image processing to convert an input contone array of contone data values to an output binary array of binary data values based on comparing each contone data value to each threshold value, wherein the comparison generates X by Y binary data values for each contone data value;
   the contone-to-encoded pattern halftoning array having M sets of pattern look-up tables, wherein M is one or more, the contone-to-encoded pattern halftoning array being configured to be used in image processing to convert an input contone array of contone data values to an output encoded array of pattern values based on comparing each of the contone data values to each set of pattern look-up tables, wherein the comparison generates M encoded pattern values for each contone data value and each encoded pattern value corresponds to a K by L multi-pixel pattern of binary data values in a library;
   the method comprising:
   replicating the X by Y threshold values into a replicated array that is evenly divisible by a K by L array;
   dividing the replicated array into K by L blocks of threshold values, wherein a number of K by L blocks is M;
   then, for each of 1 to N contone data values:
   (a) converting each of the K by L blocks of threshold values to a K by L binary array of binary data values based on comparing each contone data value to each threshold value to form a desired pattern in the block,
   (b) correlating the desired pattern in each block to a multi-pixel pattern in the library, and
   (c) entering a pattern value corresponding to the multi-pixel pattern in an array for each block to generate M sets of arrays; and
   then, after acts (a)-(c), compiling the M sets of arrays to populate the M sets of pattern look-up tables to create the contone-to-encoded pattern halftoning array.

2. The method of claim 1, wherein when correlation results in an exact correlation to an multi-pixel pattern in the library, entering includes flagging an entry in the array having the exact correlation.

3. The method of claim 1, wherein correlation includes determining whether there is an exact correlation of the desired pattern to a multi-pixel pattern in the library and when there is not an exact correlation:
   calculating a fill factor of the desired pattern;
   comparing the fill factor of the desired pattern to a fill factor of each of the multi-pixel patterns in the library to identify one or more multi-pixel patterns having the same fill factor as the desired pattern; and
   reducing the library to the one or more multi-pixel patterns to create a reduced library.

4. The method of claim 3, wherein correlating further includes
   calculating an overlap of the desired pattern with each encoded multi-pixel pattern in the reduced library to identify one or more encoded multi-pixel patterns having the greatest overlap; and
   reducing the library to the one or more encoded multi-pixel patterns having the greatest overlap.

5. The method of claim 4, wherein correlating further includes reducing the library to include one or more multi-pixel patterns having a minimum displacement of pixels with respect to the desired pattern.

6. The method of claim 5, wherein matching further includes selecting one multi-pixel pattern in the reduced library based on a comparison with a next exact correlation or a previous exact correlation flagged in the array.

7. A computer readable media having stored thereon computer executable instructions, wherein the computer executable instructions, when executed by a computer, directs a computer to perform a method for converting a contone-to-binary halftoning array to a contone-to-encoded pattern halftoning array, the contone-to-binary halftoning array having X by Y threshold values, the contone-to-binary halftoning array being configured to be used in image processing to convert an input contone array of contone data values to an output binary array of binary data values based on comparing each contone data value to each threshold value, wherein the comparison generates X by Y binary data values for each contone data value;

the contone-to-encoded pattern halftoning array having M sets of pattern look-up tables, wherein M is one or more, the contone-to-encoded pattern halftoning array being configured to be used in image processing to convert an input contone array of contone data values to an output encoded array of pattern values based on comparing each of the contone data values to each set of pattern look-up tables, wherein the comparison generates M encoded pattern values for each contone data value and each encoded pattern value corresponds to a K by L multi-pixel pattern of binary data values in a library;

the method comprising:

replicating the X by Y threshold values into a replicated array that is evenly divisible by a K by L array;

dividing the replicated array into K by L blocks of threshold values, wherein a number of K by L blocks is M;

then, for each of 1 to N contone data values:

(a) converting each of the K by L blocks of threshold values to a K by L binary array of binary data values based on comparing each contone data value to each threshold value to form a desired pattern in the block, (b) correlating the desired pattern in each block to a multi-pixel pattern in the library, and (c) entering a pattern value corresponding to the multi-pixel pattern in an array for each block to generate M sets of arrays; and then, after acts (a)-(c), compiling the M sets of arrays to populate the M sets of pattern look-up tables to create the contone-to-encoded pattern halftoning array.

8. The computer readable media of claim 7, wherein when correlation results in an exact correlation to an multi-pixel pattern in the library, entering includes flagging an entry in the array having the exact correlation.

9. The computer readable media of claim 7, wherein correlation includes determining whether there is an exact correlation of the desired pattern to a multi-pixel pattern in the library and when there is not an exact correlation:

calculating a fill factor of the desired pattern;

comparing the fill factor of the desired pattern to a fill factor of each of the multi-pixel patterns in the library to identify one or more multi-pixel patterns having the same fill factor as the desired pattern; and reducing the library to the one or more multi-pixel patterns to create a reduced library.

10. The computer readable media of claim 9, wherein correlating further includes calculating an overlap of the desired pattern with each encoded multi-pixel pattern in the reduced library to identify one or more encoded multi-pixel patterns having the greatest overlap; and reducing the library to the one or more encoded multi-pixel patterns having the greatest overlap.

11. The computer readable media of claim 10, wherein correlating further includes reducing the library to include one or more multi-pixel patterns having a minimum displacement of pixels with respect to the desired pattern.

12. The computer readable media of claim 11, wherein matching further includes selecting one multi-pixel pattern in the reduced library based on a comparison with a next exact correlation or a previous exact correlation flagged in the array.

* * * * *